US012806526B2

(12) United States Patent
Cui

(10) Patent No.: US 12,806,526 B2
(45) Date of Patent: Nov. 24, 2026

(54) VIRTUAL OBJECT CONTROL

(71) Applicant: Tencent Technology (Shenzhen) Company Limited, Shenzhen (CN)

(72) Inventor: Weijian Cui, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 55 days.

(21) Appl. No.: 18/740,406

(22) Filed: Jun. 11, 2024

(65) Prior Publication Data

US 2026/0034450 A1 Feb. 5, 2026

Related U.S. Application Data

(63) Continuation of application No. PCT/CN2023/099645, filed on Jun. 12, 2023.

(30) Foreign Application Priority Data

Aug. 18, 2022 (CN) ......................... 202210992629.3

(51) Int. Cl.
*A63F 13/56* (2014.01)
*A63F 13/537* (2014.01)

(52) U.S. Cl.
CPC ............ *A63F 13/56* (2014.09); *A63F 13/537* (2014.09)

(58) Field of Classification Search
CPC ............................... A63F 13/56; A63F 13/537
USPC ............................................................ 463/31
See application file for complete search history.

(56) References Cited

U.S. PATENT DOCUMENTS

2017/0197144 A1* 7/2017 Maa ...................... H04M 1/026

FOREIGN PATENT DOCUMENTS

| | | | |
|---|---|---|---|
| CN | 107185232 | A | 9/2017 |
| CN | 110523085 | A | 12/2019 |
| CN | 113181651 | A | 7/2021 |
| CN | 113900570 | A | 1/2022 |
| CN | 113908550 | A | 1/2022 |
| CN | 114011063 | A | 2/2022 |
| CN | 114288659 | A | 4/2022 |

(Continued)

OTHER PUBLICATIONS

International Search Report and Written Opinion received for PCT Patent Application No. PCT/CN23/099645, mailed on Sep. 19, 2023, 15 pages (6 pages of English Translation and 9 pages of Original Document).

(Continued)

*Primary Examiner* — Robert P Bullington
(74) *Attorney, Agent, or Firm* — ARENTFOX SCHIFF LLP

(57) ABSTRACT

In a virtual object control method, an operation control element that is configured to control a virtual object to move in a virtual scene is displayed. Based on a sliding touch operation being performed from a position of the operation control element to a recognition region, the virtual object is controlled to automatically move in the virtual scene in a first movement state. When a touch duration of the sliding touch operation on the recognition region reaches a threshold, the virtual object is controlled to automatically move in the virtual scene in a second movement state. A movement speed in the second movement state is faster than a movement speed in the first movement state.

16 Claims, 7 Drawing Sheets

(56) References Cited

FOREIGN PATENT DOCUMENTS

| | | | |
|---|---|---|---|
| CN | 114392554 | A | 4/2022 |
| JP | 2015-013056 | A | 1/2015 |
| JP | 2016-093361 | A | 5/2016 |
| KR | 10-2022-0083803 | A | 6/2022 |

OTHER PUBLICATIONS

Office Action received for Japanese Patent Application No. 2024-564587, mailed on Jul. 22, 2025, 9 pages (4 pages of English Translation and 5 pages of Original Document).
Office Action received for Korean Patent Application No. 10-2024-7016877, mailed on Aug. 7, 2025, 30 pages (17 pages of English Translation and 13 pages of Original Document).
Office Action received for Japanese Patent Application No. 2024-564587, mailed on Jan. 6, 2026, 9 pages (5 pages of English Translation and 4 pages of Original Document).
Nazgul, "The Secret to High Kill Counts Lies in Early-Game Deaths", Dec. 19, 2020, 9 pages (Official copy only).
Office Action received for Japanese Patent Application No. 2024-564587, mailed on Jun. 9, 2026, 8 pages (4 pages of English Translation and 4 pages of Original Document).
YAHOO!JAPAN, "In Apex Legends, is it faster to run without a weapon than to run with one?", Available online at: <https://detail.chiebukuro.yahoo.co.jp/qa/question_detail/q10228663910>, Jul. 19, 2020, 2 pages (Official copy only).

* cited by examiner

VIRTUAL OBJECT CONTROL

RELATED APPLICATIONS

The present application is a continuation of International Application No. PCT/CN2023/099645, filed on Jun. 12, 2023, which claims priority to Chinese Patent Application No. 202210992629.3, entitled "VIRTUAL OBJECT CONTROL METHOD AND APPARATUS, TERMINAL, STORAGE MEDIUM, AND PROGRAM PRODUCT" and filed on Aug. 18, 2022, which are incorporated herein by reference in their entirety.

FIELD OF THE TECHNOLOGY

Embodiments of this disclosure relate to the field of computer and Internet technologies, including to a virtual object control method and apparatus, a terminal, a storage medium, and a program product.

BACKGROUND OF THE DISCLOSURE

At present, in game application programs, a player may control, through a virtual joystick, a virtual character to move, or may control, through the virtual joystick, the virtual character to enter an automatic fast running state (namely, a sprinting state).

Using a shooting game application program as an example, the player first slides the virtual joystick upward through a left hand, to trigger the virtual character to enter a normal sprinting state (for example, holding a virtual prop), and then triggers another control through a right hand, to holster the virtual prop, so that the virtual character can sprint at a faster sprinting speed.

However, the foregoing operations for controlling the virtual character to sprint at a faster sprinting speed are complex and are not smooth and convenient enough.

SUMMARY

Embodiments of this disclosure provide a virtual object control method and apparatus, a terminal, a non-transitory computer-readable storage medium, and a program product, which can reduce the complexity of triggering a second movement state and improve the consistency and convenience of operations, thereby improving the operation efficiency. Examples of the technical solutions are as follows:

According to an aspect of the embodiments of this disclosure, a virtual object control method is provided. In an example, the method is performed by a terminal. In the virtual object control method, an operation control element that is configured to control a virtual object to move in a virtual scene is displayed. Based on a sliding touch operation being performed from a position of the operation control element to a recognition region, the virtual object is controlled to automatically move in the virtual scene in a first movement state. When a touch duration of the sliding touch operation on the recognition region reaches a threshold, the virtual object is controlled to automatically move in the virtual scene in a second movement state. A movement speed in the second movement state is faster than a movement speed in the first movement state.

According to an aspect of the embodiments of this disclosure, a processing apparatus is provided. In an example, the processing apparatus includes a virtual object control apparatus. The processing circuitry is configured to display an operation control element that is configured to control a virtual object to move in a virtual scene. The processing circuitry is configured to control, based on a sliding touch operation being performed from a position of the operation control element to a recognition region, the virtual object to automatically move in the virtual scene in a first movement state. The processing circuitry is configured to control, when a touch duration of the sliding touch operation on the recognition region reaches a threshold, the virtual object to automatically move in the virtual scene in a second movement state, a movement speed in the second movement state being faster than a movement speed in the first movement state.

According to an aspect of the embodiments of this disclosure, a terminal device is provided, including a processor and a memory, the memory having a computer program stored therein, and the computer program being loaded and executed by the processor to implement the virtual object control method.

According to an aspect of the embodiments of this disclosure, a non-transitory computer-readable storage medium is provided, storing instructions which when executed by a processor cause the processor to implement the virtual object control method.

According to an aspect of the embodiments of this disclosure, a computer program product or a computer program is provided. The computer program product or the computer program includes a computer instruction, and the computer instruction is stored in a computer-readable storage medium. A processor of a terminal device reads the computer instruction from the computer-readable storage medium, and the processor executes the computer instruction, to cause the terminal device to perform the virtual object control method.

The technical solutions provided in the embodiments of this disclosure may include the following beneficial effects:

In a case that the virtual object is in the first movement state, the virtual object may be triggered to automatically move in the virtual scene in the second movement state when the stay duration of the position of the operation control in the recognition region reaches the threshold, so that the recognition region can be operated through a single finger. That is, triggering of the first movement state and triggering of the second movement state may be performed consistently. In this way, compared with completing triggering of the second movement state through a combination of two hands or a combination of multiple fingers in the related art, the complexity of trigger operations of the second movement state can be reduced, and the consistency and the convenience of the trigger operations can be improved, thereby improving the operation efficiency.

DESCRIPTION OF EMBODIMENTS

Figure 1:
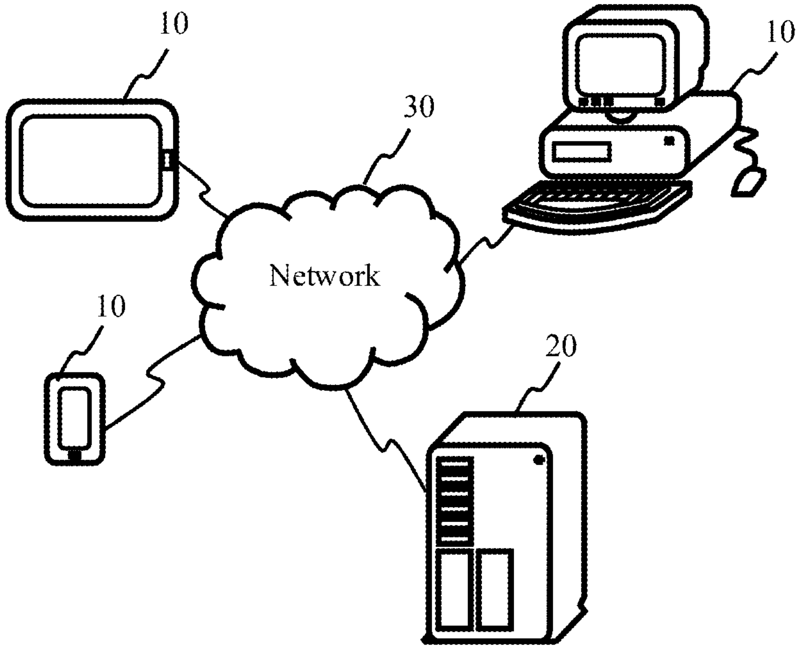
FIG. 1 is a schematic diagram of a computer system according to an embodiment of this disclosure.

FIG. 1 shows a schematic diagram of a computer system according to an embodiment of this disclosure. The computer system may include: a terminal 10 and a server 20.

The terminal 10 may be an electronic device such as a mobile phone, a tablet computer, a game console, a multimedia playback device, a personal computer (PC), or the like. A client of a target application program may be installed in the terminal 10, such as a client of a game application, a simulation learning application program, a virtual reality (VR) application program, an augmented reality (AR) application program, a social application program, an interactive entertainment application program, or the like.

The server 20 provides a background service for the client of the application program (for example, a game application program) in the terminal 10. For example, the server 20 may be a backend server of the target application program (for example, a game application program). The server 20 may be one server, a server cluster including a plurality of servers, or a cloud computing service center.

The terminal 10 may communicate with the server 20 through a network 30. The network 30 may be a wired network, or may be a wireless network.

An example in which the client is a client of a game application program is used for description. The client displays a user interface including an operation control for controlling a virtual object to move; in response to a user sliding the operation control from a position of the operation control to a recognition region after performing an operation on the operation control, the client controls the virtual object to automatically move in a virtual scene in a first movement state; and in a case that a stay duration of the operation control after a slide operation in the recognition region reaches a threshold, the client controls the virtual object to automatically move in the virtual scene in a second movement state. A movement speed in the second movement state is faster than a movement speed in the first movement state.

Figure 2:
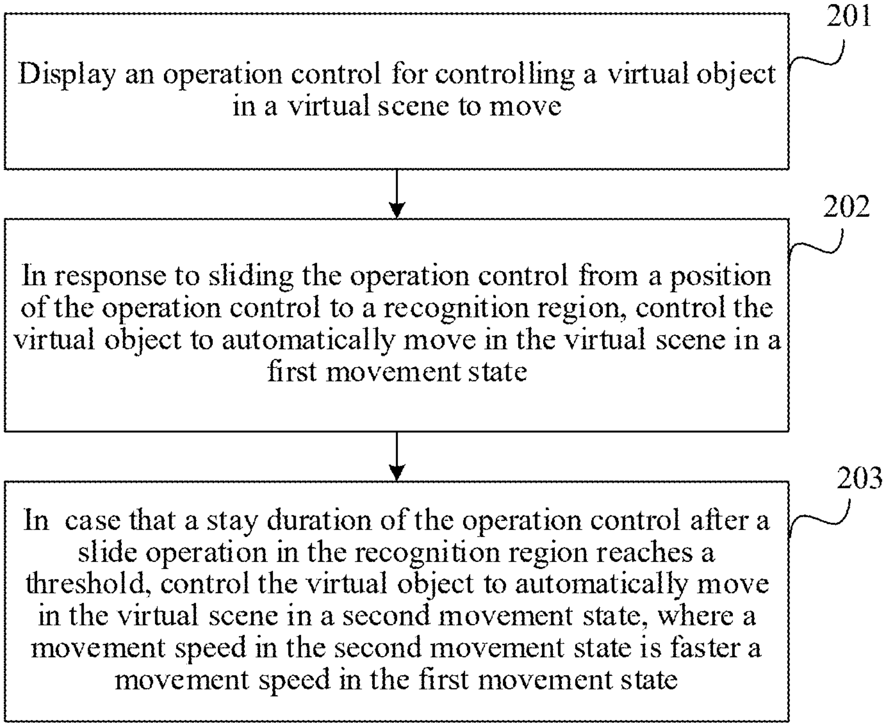
FIG. 2 is a flowchart of a virtual object control method according to an embodiment of this disclosure.

FIG. 2 shows a flowchart of a virtual object control method according to an embodiment of this disclosure. An entity performing operations of the method may be the terminal 10 in the computer system shown in FIG. 1, and the method may include the following operations (Operation 201 to Operation 203):

Operation 201. Display an operation control for controlling a virtual object in a virtual scene to move. In an example, an operation control element that is configured to control a virtual object to move in a virtual scene is displayed.

The virtual scene is displayed in a user interface. The user interface is a display interface of an application program, such as a display interface of the foregoing target application program. For example, in a shooting game application program, the user interface may be a display interface of a game battle, and the user interface is configured to present a virtual scene of the game battle to a user. In a simulation learning application program, the user interface may be a display interface of a learning scene, and the user interface is configured to present a simulated environment in the learning scene to the user. In some embodiments, the user interface includes a display layer and a control layer. A display level of the control layer is higher than a display level of the display layer. The display layer is configured to display picture information (for example, the virtual scene, a movement picture of the virtual object, or the like), and the control layer is configured to display user interface (UI) controls (for example, operation controls, buttons, sliders, or the like).

The virtual object may be a virtual object controlled by a user account in the application program (for example, a game application program). Taking a shooting game application program as an example, the virtual object may be a virtual character controlled by the user account in the game application program. The virtual object may alternatively be a virtual vehicle driven by the virtual character in the application program, such as a virtual car, a virtual aerial vehicle, a virtual hot air balloon, or the like. The virtual object is not limited in the embodiments of this disclosure.

The virtual scene is, for example, an environment displayed (or provided) when the client of the application program (for example, a game application program) is run on a terminal, and the virtual scene may be an environment created for the virtual object to perform activities (for example, a game battle), for example, a virtual house, a virtual island, a virtual sky, a virtual land, or the like. The virtual scene may be a simulated environment of a real world, or may be a semi-simulated semi-fictional environment, or may be an entirely fictional environment, which is not limited in the embodiments of this disclosure.

In the embodiments of this disclosure, the user may control the virtual object to move in the virtual scene through the operation control. For example, the operation control may be a joystick control, a handle control, a direction control, or the like.

Operation 202. Control, in response to sliding the operation control from a position of the operation control to a recognition region in a user interface, the virtual object to automatically move in the virtual scene in a first movement state. In an example, based on a sliding touch operation being performed from a position of the operation control element to a recognition region, the virtual object is controlled to automatically move in the virtual scene in a first movement state.

In some embodiments, the position of the operation control is a position of a contact on the operation control.

The contact is a contact point when operation is performed on the user interface, or the contact is a contact point of an operation by the user on a display screen of the terminal, such as a contact point between a finger of the user and the display screen of the terminal. The recognition region is a region associated with the operation control, and may be configured to change a movement state of the virtual object, or the recognition region is configured to recognize a contact slid over by the operation control. For example, through the recognition region, the virtual character may be changed from a walking state to an automatic fast running state.

In some embodiments, the position of the operation control is a position of the operation control in a game operation joystick. In some embodiments, the position of the operation control is a starting position, a default position, or an origin position of the operation control in the game operation joystick.

In the embodiments of this disclosure, the first movement state includes at least one of a movement speed, a movement posture, or a movement attribute.

In some embodiments, an example in which the virtual object is a virtual character is used, the movement speed may be a movement speed of the virtual character in the first movement state, the movement posture may include postures such as walking, running, half-squatting, sprinting, holding a virtual prop, and not holding a virtual prop, and the movement attribute may include using a virtual vehicle, not using a virtual vehicle, or the like.

For example, the virtual character in the first movement state refers to that: the virtual character holds a virtual prop and sprints at a movement speed of 2 m/s without using a virtual vehicle.

In some other embodiments, an example in which the virtual object is a virtual vehicle is used, the movement speed may be a traveling speed of the virtual vehicle in the first movement state, the movement posture may be a traveling posture of the virtual vehicle, and the movement attribute may include flying in the air, traveling on the water, traveling on a land, or the like.

For example, the virtual vehicle in the first movement state refers to that: the virtual vehicle drifts on the water at a traveling speed of 20 m/s.

Figure 3:
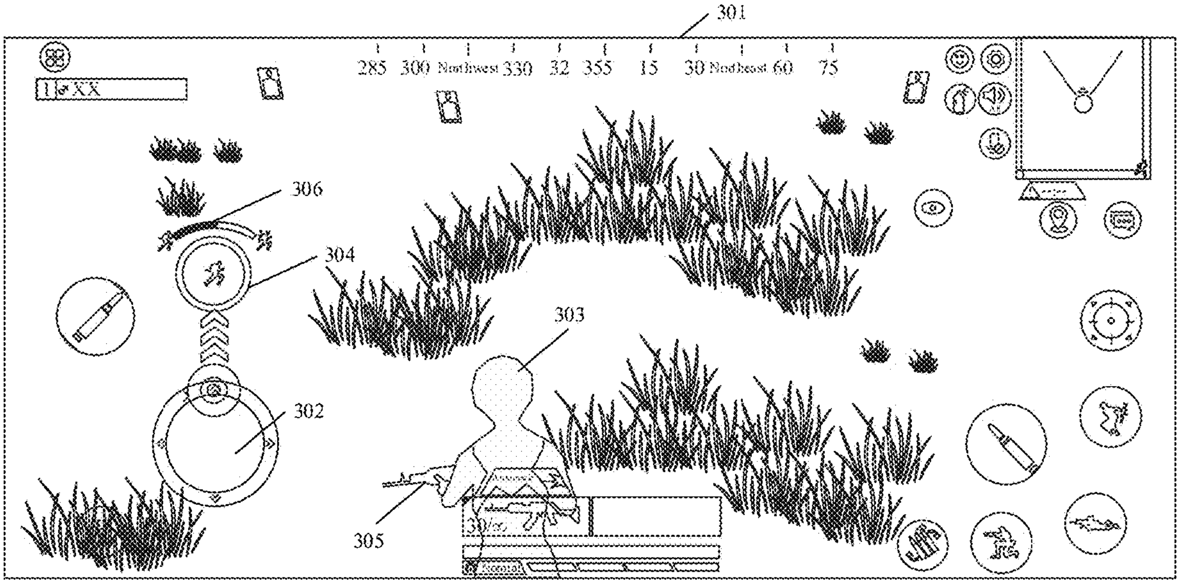
FIG. 3 is a schematic diagram of a virtual object in a first movement state according to an embodiment of this disclosure.

For example, referring to FIG. 3, in response to a trigger operation of the user on a joystick control 302 in a user interface 301, the client controls a virtual object 303 to walk in the virtual scene. In response to sliding the joystick control 302 upward by the user, the client displays a recognition region 304 at a position at a specified distance above the joystick control 302. In response to sliding a position of the joystick control 302 from the position of the joystick control 302 to the recognition region 304 by the user, the client controls the virtual object 303 to enter the first movement state. That is, the virtual object 303 automatically runs in the virtual scene in the first movement state. The first movement state may also be referred to as a common sprinting state (that is, an automatic fast running state), and a movement speed in the first movement state is faster than a movement speed in the walking state. In some embodiments, an icon corresponding to the first movement state is further displayed in the recognition region 304, to prompt the user that the virtual object 304 is in the first movement state. Text information, for example, "constant sprinting" may be configured in the icon.

In an example, in a case that the virtual object holds a virtual prop, the virtual object in the first movement state holds the virtual prop and automatically moves in the virtual scene. For example, referring to FIG. 3, the virtual object 303 in the first movement state holds a virtual prop 305, and automatically runs in the virtual scene at the movement speed in the first movement state. In some embodiments, in a case that the virtual object does not hold a virtual prop, the virtual object may automatically move in the virtual scene in an empty-handed manner (that is, not holding the virtual prop).

In an example, the client displays a dynamic prompt icon in a nearby region of the recognition region in response to that the operation control is slid from the position of the operation control to the recognition region after a slide operation, where the dynamic prompt icon is configured to indicate a stay duration.

The dynamic prompt icon may be configured to dynamically present the stay duration, and a filling degree of elements in the dynamic prompt icon changes along with the stay duration. In some embodiments, a first icon configured to indicate the first movement state is displayed at an end of the dynamic prompt icon, and a second icon configured to indicate a second movement state is displayed at the other end of the dynamic prompt icon. For example, the dynamic prompt icon may be a progress bar, an hourglass, or the like.

For example, referring to FIG. 3, in response to that the joystick control 302 is slid from the position of the joystick control to the recognition region 304, the client displays the dynamic prompt icon 306 above the recognition region 304. The first icon configured to indicate the first movement state is displayed at a left end of the dynamic prompt icon 306, and the second icon configured to indicate the second movement state is displayed at a right end of the dynamic prompt icon 306.

A movement speed in the second movement state is faster than the movement speed in the first movement state. In some embodiments, a movement posture in the second movement state may be different from the movement posture in the first movement state. For example, the movement posture in the second movement state is moving in a half-squatting posture, and the movement posture in the first movement state is moving in a standing posture. In an example, in a case that the virtual object holds a virtual prop, the virtual object in the second movement state holsters the virtual prop and automatically moves in the virtual scene. For example, referring to FIG. 3 and FIG. 4, the virtual object 303 in the second movement state holsters the virtual prop 305, and automatically runs in the virtual scene at the movement speed in the second movement state. A movement attribute in the second movement state may be the same as the movement attribute in the first movement state. For example, both the virtual object in the second movement state and the virtual object in the first movement state do not use a virtual vehicle.

In an example, the stay duration is a duration that the operation control stays after the slide operation in the recognition region. In some embodiments, in a case that the operation control is slid to the recognition region and immediately leaves the recognition region, the dynamic prompt icon is not displayed.

In an example, the filling degree of the elements in the dynamic prompt icon is positively correlated with the stay duration, and a filling process of the elements in the dynamic prompt icon may be as follows: displaying, in a case that the operation control after the slide operation stays in the recognition region, an animation that the elements in the dynamic prompt icon are dynamically filled; displaying, in a case that the stay duration reaches the threshold, an animation that filling of the elements in the dynamic prompt icon is completed; and canceling displaying of the dynamic prompt icon and displaying of the recognition region.

Figure 4:
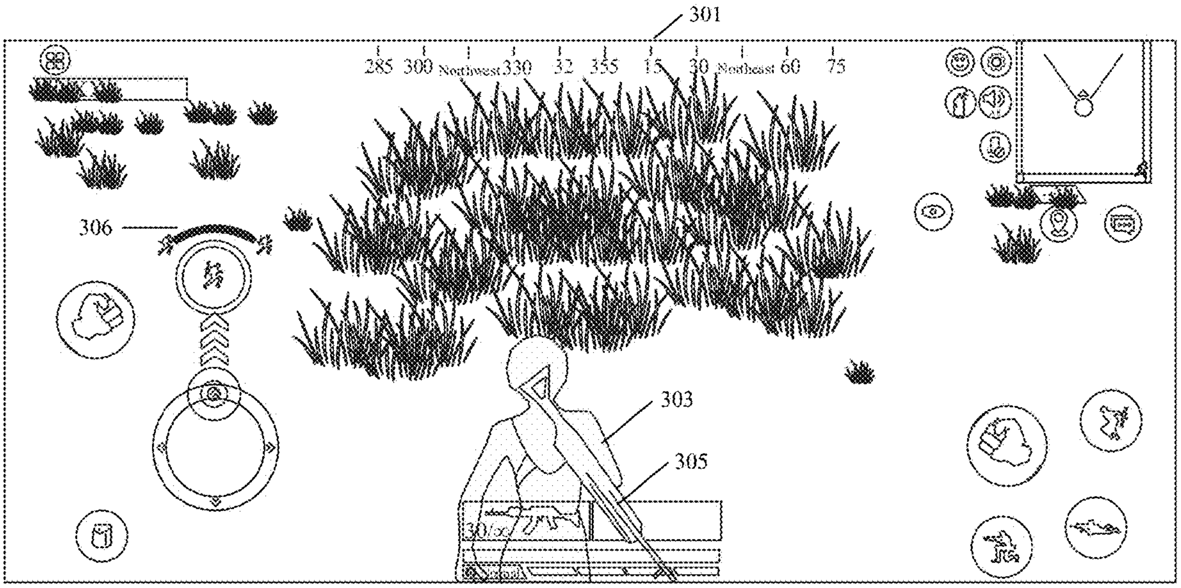
FIG. 4 is a schematic diagram of a virtual object in a second movement state according to an embodiment of this disclosure.
Figure 5:
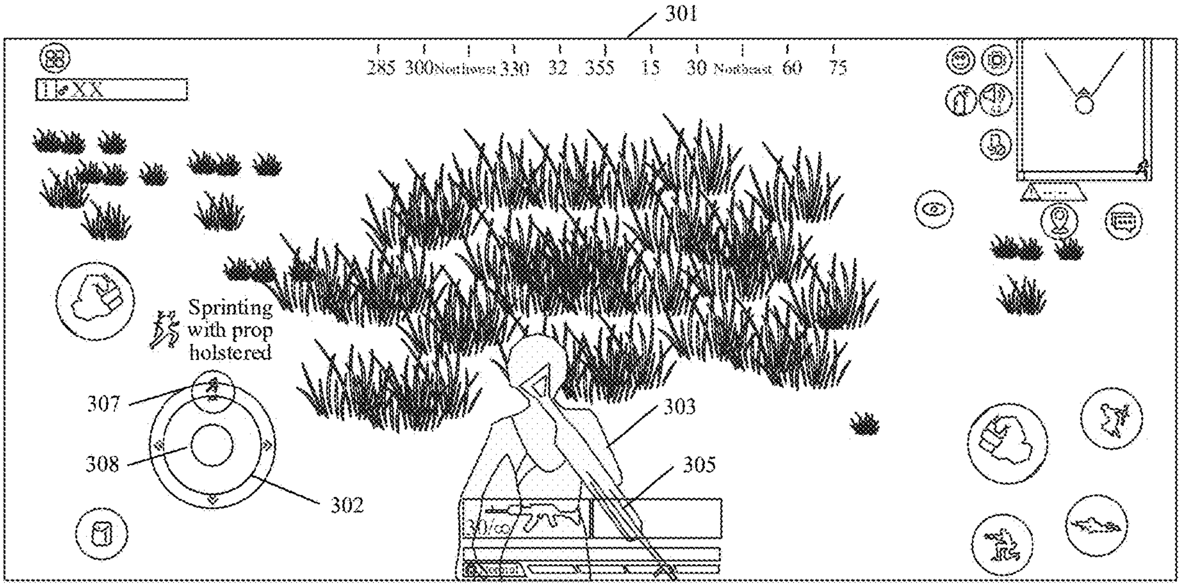
FIG. 5 is a schematic diagram of a first state control and a second state control according to an embodiment of this disclosure.

For example, referring to FIG. 3, FIG. 4, and FIG. 5, as the stay duration increases, the elements in the dynamic prompt icon 306 gradually fills the dynamic prompt icon 306, and in a case that the stay duration reaches the threshold, filling of the elements in the dynamic prompt icon 306 is completed. In addition, the client cancels displaying of the dynamic prompt icon 306 and displaying of the recognition region 304.

In this way, the stay duration is displayed in a visualized manner through the dynamic prompt icon, so that the user can obtain the stay duration more intuitively for subsequent operations, thereby improving user experience.

Operation 203. In a case that the stay duration of the operation control after a slide operation in the recognition region reaches a threshold, control the virtual object to automatically move in the virtual scene in a second movement state. The movement speed in the second movement state is faster than the movement speed in the first movement state. In an example, when a touch duration of the sliding touch operation on the recognition region reaches a threshold, the virtual object is controlled to automatically move in the virtual scene in a second movement state. A movement speed in the second movement state is faster than a movement speed in the first movement state.

In some embodiments, when the operation control after the slide operation is slid to the recognition region, calculation of the stay duration is started. The threshold may be adaptively set and adjusted according to an actual usage requirement. For example, the threshold may be 2 s, 2.5 s, 3 s, or the like. For example, in a case that the virtual object is in the first movement state, in response to that the stay duration reaches the threshold (namely, greater than or equal to the threshold), the client controls the virtual object to enter the second movement state, namely, controls the virtual object to automatically move in the virtual scene at the movement speed, the movement posture, or the like corresponding to the second movement state.

For example, referring to FIG. 4 and FIG. 5, when a progress bar of the dynamic prompt icon 306 is completed, the virtual object 303 holsters the virtual prop 305 and automatically runs in the virtual scene at the movement speed corresponding to the second movement state. That is, the virtual object 303 enters a sprinting state with prop holstered. In some embodiments, an icon corresponding to the second movement state is updated and displayed in the recognition region 304, to prompt the user that the virtual object 303 is in the second movement state. Text information, for example, "sprinting with prop holstered" may be configured in the icon. In response to that the user ends the trigger operation on the joystick control 302, the joystick control 302 correspondingly displays prompt information of "sprinting with prop holstered".

In an example, after the virtual object enters the second movement state, the client further displays a first state control and a second state control. The first state control is configured to switch a movement state of the virtual object, and the second state control is configured to control the virtual object to stop moving automatically.

For example, referring to FIG. 5, in response to that the user ends the trigger operation on the joystick control 302, the client controls the virtual object 303 to continue to keep the second movement state, and display a first state control 307 and a second state control 308 in a movable region of the joystick control 302. The first state control 307 is located above the second state control 308. In some embodiments, the first state control 307 and the second state control 308 may be buttons. The first state control 307 correspondingly displays prompt information of a movement state to which the virtual object may be switched. The second state control 308 correspondingly displays prompt information of "stopping moving automatically".

In an example, the client controls, in response to a trigger operation on the first state control, the virtual object to switch from the second movement state to the first movement state.

Figure 6:
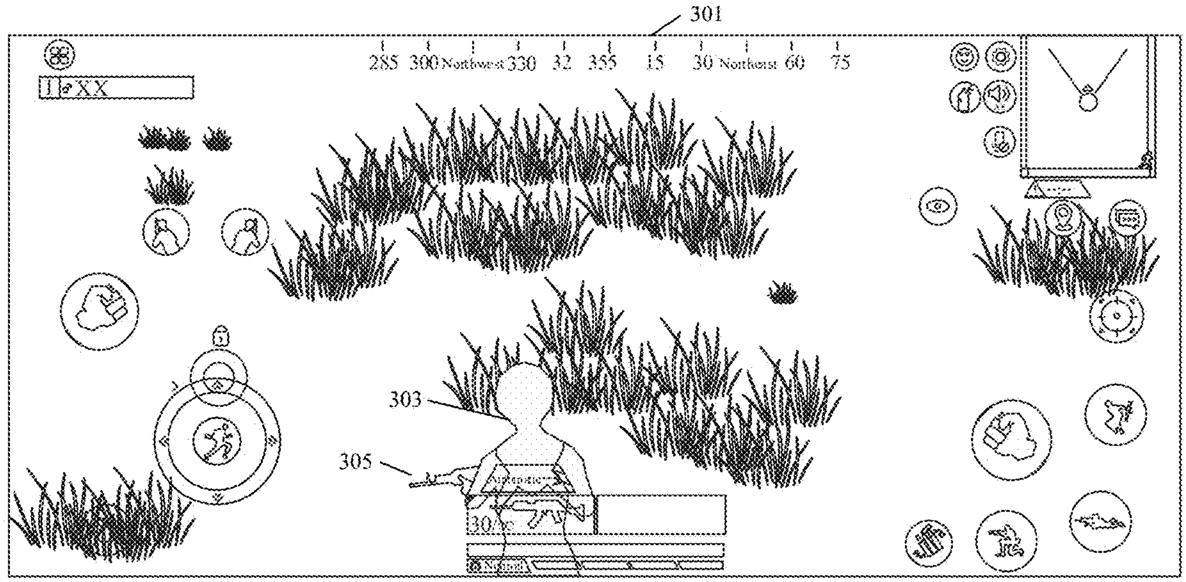
FIG. 6 is a schematic diagram of a virtual object when a first state control is triggered according to an embodiment of this disclosure.

For example, referring to FIG. 5 and FIG. 6, in response to a trigger operation of the user on the first state control 307, the virtual object 303 is switched from a state of automatically fast running without the virtual prop 305 to a state of automatically fast running with the virtual prop 305.

In another example, the client controls, in response to a trigger operation on the second state control, the virtual object to stop moving automatically and hold a virtual prop.

Figure 7:
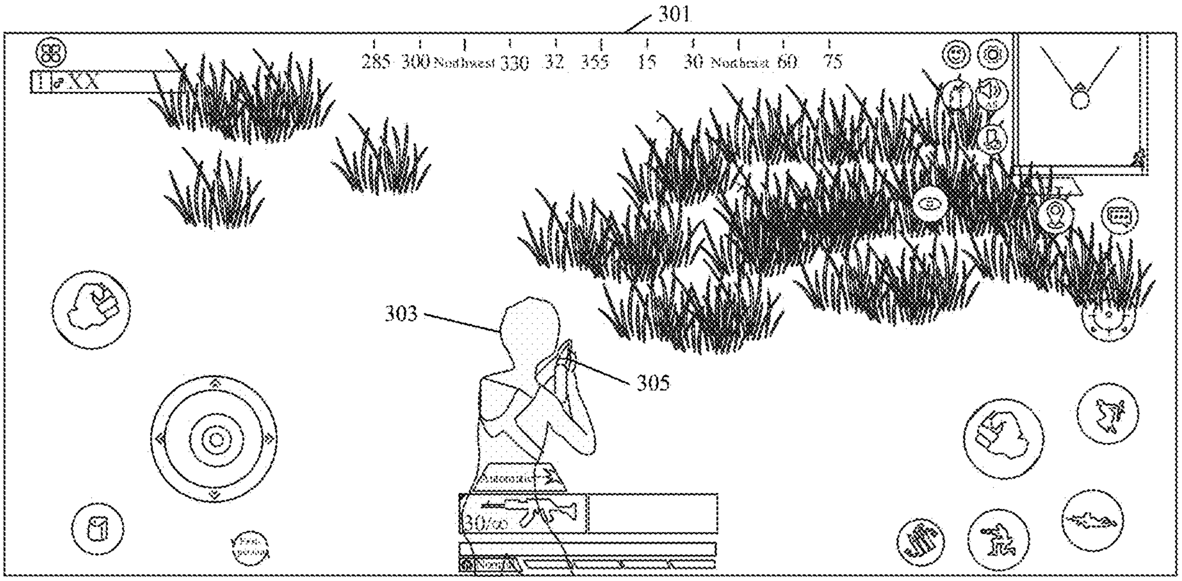
FIG. 7 is a schematic diagram of a virtual object when a second state control is triggered according to an embodiment of this disclosure.

For example, referring to FIG. 7, in response to a trigger operation of the user on the second state control 308, the virtual object 303 stops automatic fast running and takes out the virtual prop 305, or the virtual object 303 takes out the virtual prop 305 and stops automatic fast running. In this way, actions of taking out the virtual prop and stopping automatic running may be implemented through one button, and compared with the operations of first controlling the virtual object to stop running through an operation control and then controlling the virtual object to take out the virtual prop through a holding control corresponding to the virtual prop in the related art, this switching operation in the technical solutions provided in the embodiments of this disclosure is simpler and more convenient.

In some embodiments, the client hides, in response to the trigger operation on the first state control or the second state control, displaying of the first state control and displaying of the second state control. In this way, the operation control may be restored to a normal state, so that the user can continue to use the operation control normally.

In an example, in response to sliding the operation control from the position of the operation control to the recognition region, if the virtual object holds a virtual prop, the client performs the operation of controlling the virtual object to automatically move in the virtual scene in a first movement state; and if the virtual object does not hold a virtual prop, the client performs the operation of controlling the virtual object to automatically move in the virtual scene in a second movement state.

For example, in response to sliding the operation control from the position of the operation control to the recognition region, if the virtual object holds a virtual prop, the client controls the virtual object to hold the virtual prop and automatically move in the virtual scene at the movement speed in the first movement state; and if the virtual object does not hold a virtual prop, the client controls the virtual object to be empty-handed and automatically move in the virtual scene at the movement speed in the second movement state.

In an example, a method for determining a movement speed of the virtual object may be as follows: in a case that the stay duration is greater than or equal to 0 and less than the threshold, determining the movement speed of the virtual object as a first movement speed; and in a case that the stay duration is greater than or equal to the threshold, determining the movement speed of the virtual object as a second movement speed, where the second movement speed is a sum of a product of the stay duration and a specified ratio and the first movement speed.

In a case that the stay duration is greater than or equal to 0 and less than the threshold, the virtual object is switched to the first movement state. That is, the movement speed in the first movement state is fixed to the first movement speed. In a case that the stay duration is greater than or equal to the threshold, the virtual object is switched to the second movement state. That is, the movement speed in the second movement state increases as the stay duration increases based on the first movement speed.

Based on the above, according to the technical solutions provided in the embodiments of this disclosure, in a case that the virtual object is in the first movement state, the virtual object may be triggered to automatically move in the virtual scene in the second movement state when the stay duration of the operation control in the recognition region reaches the threshold, so that the recognition region can be operated through a single finger. That is, triggering of the first movement state and triggering of the second movement state may be performed consistently. In this way, compared with completing triggering of the second movement state through a combination of two hands or a combination of multiple fingers in the related art, the complexity of trigger operations of the second movement state can be reduced, and the consistency and the convenience of the trigger operations can be improved, thereby improving the operation efficiency.

In addition, by supporting a function of implementing actions of taking out the virtual prop and stopping automatic running through one button, compared with the operations of first controlling the virtual object to stop running through an operation control and then controlling the virtual object to take out the virtual prop through a holding control corresponding to the virtual prop in the related art, this switching operation in the technical solutions provided in the embodiments of this disclosure can be simpler and more convenient, thereby further improving the operation efficiency.

Figure 8:
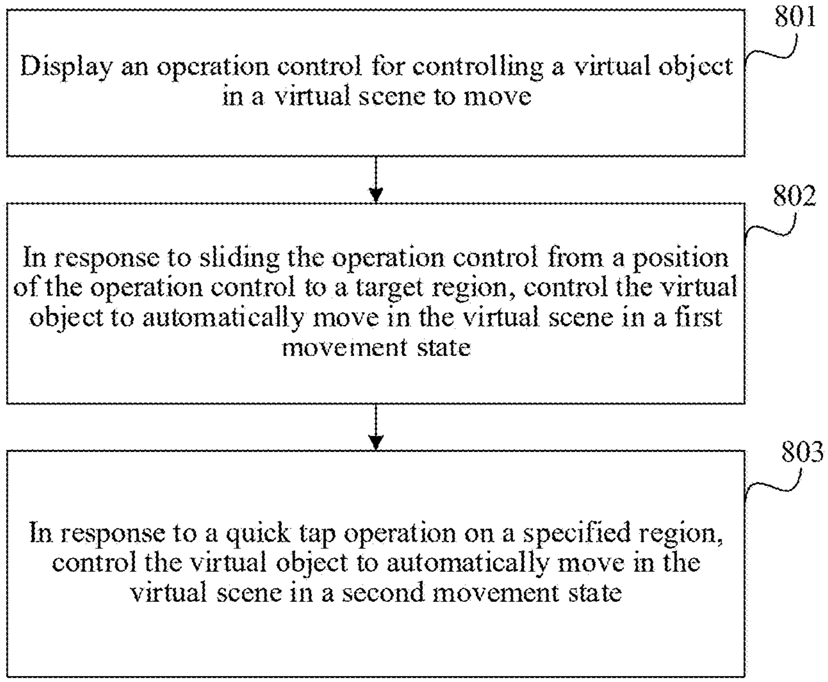
FIG. 8 is a flowchart of a virtual object control method according to another embodiment of this disclosure.

FIG. 8 shows a flowchart of a virtual object control method according to another embodiment of this disclosure. An entity performing operations of the method may be the terminal 10 in the computer system shown in FIG. 1, and the method may include the following operations (Operation 801 to Operation 803):

Operation 801. Display an operation control for controlling a virtual object in a virtual scene to move.

Operation 802. In response to sliding the operation control from a position of the operation control to a recognition region, control the virtual object to automatically move in the virtual scene in a first movement state.

Descriptions of Operation 801 and Operation 802 are the same as those in the foregoing embodiments. For content not described in this embodiment of this disclosure, reference may be made to the foregoing embodiments, and details are not described herein again.

Operation 803. In response to a quick tap operation on a specified region, control the virtual object to automatically move in the virtual scene in a second movement state.

The quick tap operation may be a plurality of consecutive tap operations, and in the plurality of consecutive tap operations, a time interval between two adjacent tap operations is less than a preset threshold. In some embodiments, the quick tap operation may be a double-tap operation. The double-tap operation refers an operation including two consecutive taps with a time interval of the two consecutive taps less than the preset threshold. In some embodiments, the quick tap operation may alternatively be a triple-tape operation, a quadruple-tap operation, or the like, which is not limited in the embodiments of this disclosure. The specified region is not limited in the embodiments of this disclosure, and the specified region may be the foregoing recognition region. For example, in response to that the user ends the slide operation on the operation control, the recognition region may continue to be displayed for a specified duration, for the user to perform the quick tap operation. The specified region may alternatively be a newly added tap operation detection region for detecting the quick tap operation. For example, in response to that the user ends the slide operation on the operation control, displaying of the recognition region is canceled, and the tap operation detection region is displayed at a display position corresponding to the recognition region or near the recognition region, for the user to implement the quick tap operation.

For example, in a case that the virtual object is in the first movement state, in response to a double-tap operation of the user on the specified region, the client controls the virtual object to automatically move in the virtual scene in the second movement state.

In the embodiments of this disclosure, an obtaining process of a movement speed corresponding to the second movement state may be as follows:

1. Obtaining attribute information of the quick tap operation.

In some embodiments, the attribute information of the quick tap operation may be a number of taps, a tap speed, or the like of the quick tap operation.

2. Determining the movement speed corresponding to the second movement state according to the attribute information of the quick tap operation.

In some embodiments, the movement speed corresponding to the second movement state is positively correlated with the attribute information of the quick tap operation.

For example, the movement speed corresponding to the second movement state is positively correlated with the number of taps of the quick tap operation. For example, in a case that the number of taps of the quick tap operation is 2, the movement speed corresponding to the second movement state is a first-level movement speed, in a case that the number of taps of the quick tap operation is 3, the movement speed corresponding to the second movement state is a second-level movement speed, and in a case that the number of taps of the quick tap operation is 4, the movement speed corresponding to the second movement state is a third-level movement speed. The third-level movement speed is faster than the second-level movement speed, and the second-level movement speed is faster than the first-level movement speed.

In some embodiments, the movement speed corresponding to the second movement state may alternatively be positively correlated with the tap speed of the quick tap operation, where a faster tap speed of the quick tap operation indicates a faster movement speed corresponding to the second movement state.

3. Controlling the virtual object to automatically move in the virtual scene in the second movement state.

In some embodiments, the client controls the virtual object to automatically move in the virtual scene at the determined movement speed corresponding to the second movement state.

Based on the above, according to technical solutions provided in the embodiments of this disclosure, in a case that the virtual object is in the first movement state, the virtual object may be triggered to automatically move in the virtual scene in the second movement state when the quick tap operation is performed on the specified region, so that the recognition region can be operated through a single hand. That is, triggering of the first movement state and triggering of the second movement state may be performed consistently. In this way, compared with completing triggering of the second movement state through a combination of two hands or a combination of multiple fingers in the related art, the complexity of trigger operations of the second movement state can be reduced, and the consistency and the convenience of the trigger operations can be improved, thereby improving the operation efficiency.

Figure 9:
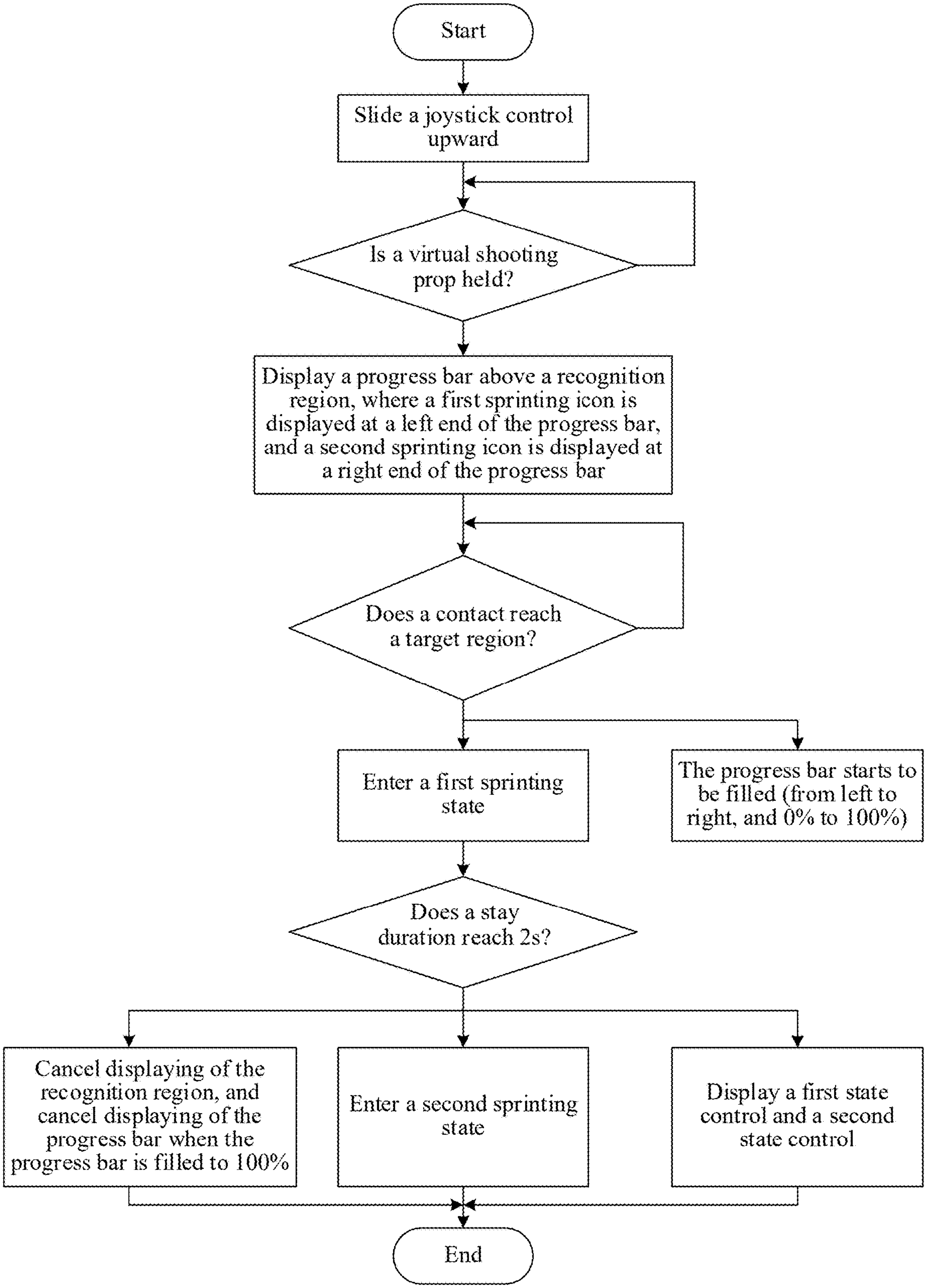
FIG. 9 is a flowchart of a virtual object control method in a shooting game application program according to an embodiment of this disclosure.

In an embodiment, referring to FIG. 9, using a virtual character in a shooting game application program as an example, the virtual object control method provided in the embodiments of this disclosure may further include the following content:

The client displays a user interface, and a virtual scene picture is displayed in the user interface. In the virtual scene picture, the virtual character holds a virtual shooting prop. In some embodiments, a joystick control configured to control the virtual character to move is further displayed in the user interface.

In response to an upward slide operation of the user on the joystick control, the client displays a recognition region associated with the joystick control. The recognition region may be configured to control the virtual character to enter a first sprinting state. The virtual character in the first sprinting state holds the virtual shooting prop and performs automatic fast running in the virtual scene.

The client detects whether the virtual character holds the virtual shooting prop. If the client detects that the virtual character holds the virtual shooting prop, the client displays a progress bar (that is, the foregoing dynamic prompt icon) above the recognition region.

Otherwise, the client does not display the progress bar, and continues to detect whether the virtual character holds the virtual shooting prop. The progress bar is configured to indicate, in a visualized manner, a stay duration of the slide operation lasting in the recognition region, and a bar progress of the progress bar is positively correlated with the stay duration.

In some embodiments, a first sprinting icon corresponding to the first sprinting state is displayed at a left end of the progress bar, and a second sprinting icon corresponding to a second sprinting state is displayed at a right end of the progress bar. The virtual character in the second sprinting state holsters the virtual shooting prop and performs automatic fast running in the virtual scene. A running speed in the second sprinting state is faster than a running speed in the first sprinting state.

The client detects whether a current position of the operation control reaches the recognition region, namely, detects whether the current position of the operation control is in contact with or overlaps with the recognition region. If the client detects that the current position of the operation control reaches the recognition region, the progress bar starts to be adjusted from left to right, namely, the bar progress is increased (for example, 0% to 100%). If the client does not detect that the current position of the operation control reaches the recognition region, the client continues to detect whether the current position of the operation control reaches the recognition region.

In addition, the client controls the virtual object to enter the first sprinting state. For example, the virtual object holds the virtual shooting prop and performs automatic running in the virtual scene at the running speed in the first sprinting state. In this case, text "sprinting with prop held" is displayed in the user interface.

In a case that the current position of the operation control does not leave the recognition region, the client continuously counts the stay duration corresponding to the operation control, and detects whether the stay duration reaches 2 s. If the stay duration reaches 2 s, the client controls the virtual object to enter the second sprinting state. For example, the virtual object holsters the virtual shooting prop and performs automatic running in the virtual scene at the running speed in the second sprinting state. In this case, text "sprinting with prop holstered" is displayed in the user interface. Otherwise, the client continues to detect whether the stay duration reaches 2 s.

After the virtual object enters the second sprinting state, in response to that the user ends the slide operation, the client determines the running speed in the second sprinting state according to the stay duration. Meanwhile, the client cancels displaying of the recognition region, and displays a picture that displaying of the progress bar is canceled after the progress bar is filled to 100%.

In some embodiments, after the virtual object enters the second sprinting state, a first state control and a second state control are displayed in a movable region of the joystick control. The first state control is configured to control the virtual object to switch from the second sprinting state to the first sprinting state. The second state control is configured to control the virtual object to stop automatic fast running and holes the virtual shooting prop.

Figure 10:
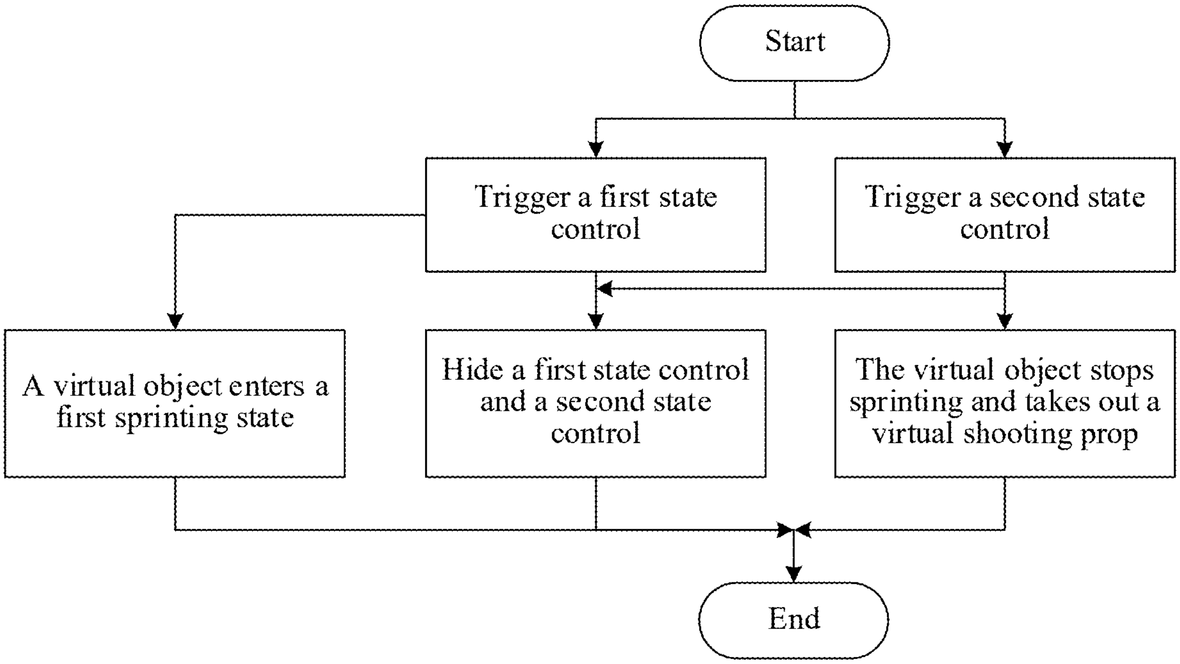
FIG. 10 is a flowchart of a virtual object control method in a shooting game application program according to another embodiment of this disclosure.

Referring to FIG. 10, after the first state control and the second state control are displayed, the client detects the first state control and the second state control.

In a case that the user triggers the first state control, the client controls the virtual object to switch from the second sprinting state to the first sprinting state, and hides displaying of the first state control and displaying of the second state control. That is, the joystick is changed to a default static state. In this case, text "sprinting with prop held" is displayed in the user interface.

In a case that the user triggers the second state control, the client controls the virtual object to stop sprinting and take out the virtual shooting prop, to wait for further control from the user. In addition, the client hides displaying of the first state control and displaying of the second state control. In this case, displaying of the text "sprinting with prop held" in the user interface is canceled.

Based on the above, according to technical solutions provided in embodiments of this disclosure, in a case that the virtual object is in the first movement state, the virtual object may be triggered to automatically move in the virtual scene in the second movement state when the stay duration of the operation control in the recognition region reaches the threshold, so that the recognition region can be operated through a single finger. That is, triggering of the first movement state and triggering of the second movement state may be performed consistently. In this way, compared with completing triggering of the second movement state through a combination of two hands or a combination of multiple fingers in the related art, the complexity of trigger operations of the second movement state can be reduced, and the consistency and the convenience of the trigger operations can be improved, thereby improving the operation efficiency.

An apparatus embodiment of this disclosure is described below, and may be used to perform the method embodiments of this disclosure. For details not disclosed in the apparatus embodiment of this disclosure, reference may be made to the method embodiments of this disclosure.

Figure 11:
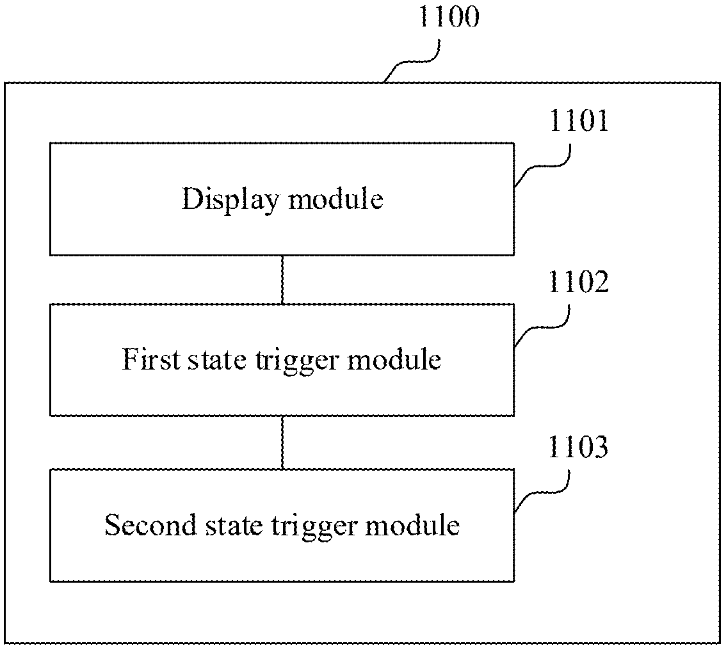
FIG. 11 is a block diagram of a virtual object control apparatus according to an embodiment of this disclosure.

FIG. 11 shows a block diagram of a virtual object control apparatus according to an embodiment of this disclosure. The apparatus has a function of performing the foregoing method embodiments, the function may be implemented by hardware or may be implemented by hardware executing corresponding software. The apparatus may be the terminal device described above or may be arranged in the terminal device. As shown in FIG. 11, the apparatus 1100 includes: a display module 1101, a first state trigger module 1102, and a second state trigger module 1103.

The display module 1101 is configured to display an operation control for controlling a virtual object in a virtual scene to move.

The first state trigger module 1102 is configured to control, in response to sliding the operation control from a position of the operation control to a recognition region in a user interface, the virtual object to automatically move in the virtual scene in a first movement state, where the recognition region is configured to recognize a position of the operation control after a slide operation.

The second state trigger module 1103 is configured to control, in a case that a stay duration of the operation control after the slide operation in the recognition region reaches a threshold, the virtual object to automatically move in the virtual scene in a second movement state. A movement speed in the second movement state is faster than a movement speed in the first movement state.

Figure 12:
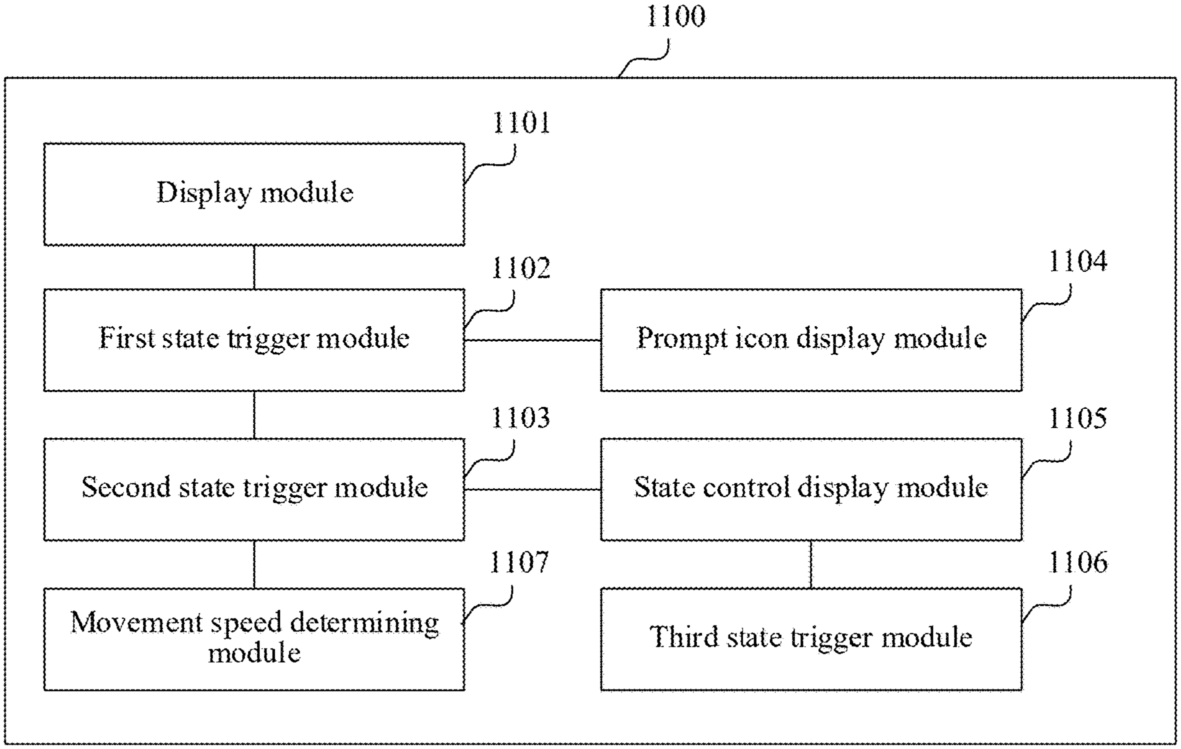
FIG. 12 is a block diagram of a virtual object control apparatus according to another embodiment of this disclosure.

In an embodiment, as shown in FIG. 12, the apparatus 1100 further includes: a prompt icon display module 1104.

The prompt icon display module 1104 is configured to display a dynamic prompt icon in a nearby region of the recognition region in response to sliding the operation control from the position of the operation control to the recognition region, where the dynamic prompt icon is configured to indicate the stay duration.

In an embodiment, the prompt icon display module 1104 is configured to:

display, in a case that the operation control after the slide operation stays in the recognition region, an animation that elements in the dynamic prompt icon are dynamically filled, where a filling degree of the elements in the dynamic prompt icon is positively correlated with the stay duration;

display, in a case that the stay duration reaches the threshold, an animation that filling of the elements in the dynamic prompt icon is completed; and cancel displaying of the dynamic prompt icon and displaying of the recognition region.

In an embodiment, a first icon configured to indicate the first movement state is displayed at an end of the dynamic prompt icon, and a second icon configured to indicate the second movement state is displayed at the other end of the dynamic prompt icon.

In an embodiment, as shown in FIG. 12, the apparatus 1100 further includes: a state control display module 1105.

The state control display module 1105 is configured to display a first state control and a second state control, where the first state control is configured to switch a movement state of the virtual object, and the second state control is configured to control the virtual object to stop moving automatically.

In an embodiment, as shown in FIG. 12, the apparatus 1100 further includes: a third state trigger module 1106.

The first state trigger module 1102 is configured to control, in response to a trigger operation on the first state control, the virtual object to switch from the second movement state to the first movement state; or the third state trigger module 1106 is configured to control, in response to a trigger operation on the second state control, the virtual object to stop moving automatically and hold a virtual prop.

In an embodiment, the state control display module 1105 is configured to hide, in response to a trigger operation on the first state control or the second state control, displaying of the first state control and displaying of the second state control.

In an embodiment, the first state trigger module 1102 is further configured to perform, in response to sliding the operation control from the position of the operation control to the recognition region, the operation of controlling the virtual object to automatically move in the virtual scene in a first movement state if the virtual object holds a virtual prop.

The second state trigger module 1103 is further configured to perform, in response to sliding the operation control from the position of the operation control to the recognition region, the operation of controlling the virtual object to automatically move in the virtual scene in a second movement state if the virtual object does not hold a virtual prop.

In an embodiment, the virtual object in the first movement state holds the virtual prop and automatically moves in the virtual scene; and the virtual object in the second movement state holsters the virtual prop and automatically moves in the virtual scene.

In an embodiment, as shown in FIG. 12, the apparatus 1100 further includes: a movement speed determining module 1107.

The movement speed determining module 1107 is configured to determine a movement speed of the virtual object as a first movement speed in a case that the stay duration is greater than or equal to 0 and less than the threshold.

The movement speed determining module 1107 is further configured to determine the movement speed of the virtual object as a second movement speed in a case that the stay duration is greater than or equal to the threshold, where the second movement speed is a sum of a product of the stay duration and a specified ratio and the first movement speed.

In an embodiment, the second state trigger module 1103 is further configured to control, in a case that the virtual object is in the first movement state, in response to a quick tap operation on a specified region, the virtual object to automatically move in the virtual scene in the second movement state.

In an embodiment, the second state trigger module 1103 is further configured to:

determine a movement speed corresponding to the second movement state according to attribute information of the quick tap operation; and control the virtual object to automatically move in the virtual scene in the second movement state.

Based on the above, according to technical solutions provided in embodiments of this disclosure, in a case that the virtual object is in the first movement state, the virtual object may be triggered to automatically move in the virtual scene in the second movement state when the stay duration of the operation control in the recognition region reaches the threshold, so that the recognition region can be operated through a single finger. That is, triggering of the first movement state and triggering of the second movement state may be performed consistently. In this way, compared with completing triggering of the second movement state through a combination of two hands or a combination of multiple fingers in the related art, the complexity of trigger operations of the second movement state can be reduced, and the consistency and the convenience of the trigger operations can be improved, thereby improving the operation efficiency.

When the apparatus provided in the foregoing embodiment implements the functions of the apparatus, only division of the foregoing functional modules is used as an example for description. During practical application, the functions may be a be allocated to and completed by different functional modules according to requirements. That is, an internal structure of the device is divided into different functional modules, to complete all or some of the functions described above. In addition, the apparatus provided in the foregoing embodiment and the method embodiments belong to one conception. For a specific implementation process, reference may be made to the method embodiments. Details are not described herein again.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

Figure 13:
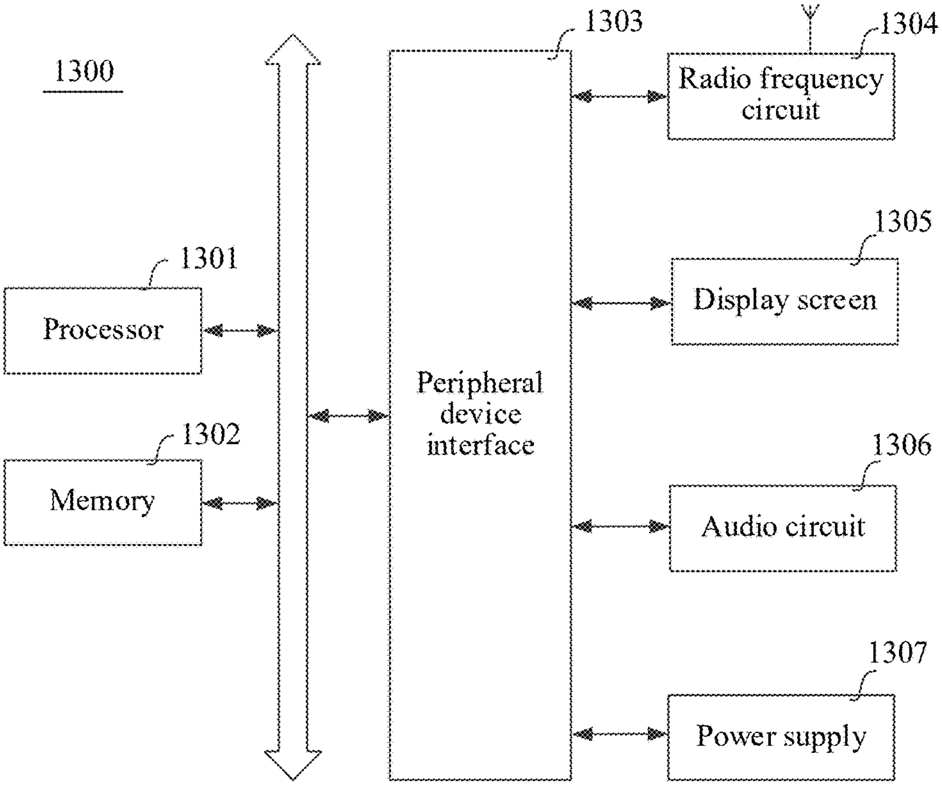
FIG. 13 is a block diagram of a terminal device according to an embodiment of this disclosure.

FIG. 13 shows a structural block diagram of a terminal device 1300 according to an embodiment of this disclosure. The terminal device may be configured to implement the virtual object control method provided in the foregoing embodiments. The terminal device may be the terminal 10 in the computer system shown in FIG. 1.

In an example, the terminal device 1300 includes processing circuitry, such as a processor 1301, and a memory 1302.

In some embodiments, the processor 1301 may include one or more processing cores, for example, a 4-core processor or an 8-core processor. The processor 1301 may be implemented by using at least one hardware form of a digital signal processor (DSP), a field-programmable gate array (FPGA), or a programmable logic array (PLA). The processor 1301 may also include a main processor and a coprocessor, where the main processor is a processor configured to process data in an awake state, and is also referred to as a central processing unit (CPU); and the coprocessor is a low power consumption processor configured to process data in a standby state. In some embodiments, the processor 1301 may be integrated with a graphics processing unit (GPU), and the GPU is configured to render and draw content that needs to be displayed on a display screen. In some embodiments, the processor 1301 may further include an artificial intelligence (AI) processor, and the AI processor is configured to process computing operations related to machine learning.

In some embodiments, the memory 1302 may include one or more computer-readable storage media that may be non-transient. The memory 1302 may further include a high-speed random access memory and a non-volatile memory, for example, one or more magnetic disk storage devices or flash memories. In some embodiments, the non-transient computer-readable storage medium in the memory 1302 is configured to store a computer program, and the computer program is configured to be executed by one or more processors to implement the virtual object control method.

In some embodiments, the terminal device 1300 further includes: a peripheral device interface 1303 and at least one peripheral device. The processor 1301, the memory 1302, and the peripheral device interface 1303 may be connected through a bus or a signal cable. Each peripheral device may be connected to the peripheral device interface 1303 through the bus, the signal cable, or a circuit board. Specifically, the peripheral device includes at least one of a radio frequency circuit 1304, a display screen 1305, an audio circuit 1306, or a power supply 1307.

A person skilled in the art may understand that, the structure shown in FIG. 13 does not constitute a limitation to the terminal device 1300, and the terminal device may include more or fewer components than those shown in the figure, or some components may be combined, or a different component arrangement may be used.

In an embodiment, a computer-readable storage medium, such as a non-transitory computer-readable storage medium, is further provided. The storage medium has a computer program stored therein, and when the computer program is executed by a processor, the virtual object control method is implemented.

In some embodiments, the computer-readable storage medium may include a read-only memory (ROM), a random access memory (RAM), a solid-state drive (SSD), an optical disc, or the like. The RAM may include a resistance random access memory (ReRAM) and a dynamic random access memory (DRAM).

In an embodiment, a computer program product or a computer program is further provided, where the computer program product or the computer program includes a computer instruction, and the computer instruction is stored in a computer-readable storage medium. A processor of a terminal device reads the computer instruction from the computer-readable storage medium, and the processor executes the computer instruction, to cause the terminal device to perform the virtual object control method.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

What is claimed is:

1. A virtual object control method, comprising:

outputting for display, in a user interface of a game application, an operation control element that is configured to control movement of a virtual object in a virtual scene;

outputting for display, based on a sliding touch operation being performed in the user interface from a position of the operation control element, a recognition region associated with the operation control element in the user interface;

determining that at least a portion of the operation control element is in the recognition region;

controlling, in response to determining that at least the portion of the operation control element is in the recognition region, the virtual object to automatically move in the virtual scene in a first movement state;

outputting for display, in response to the sliding touch operation being performed from the position of the operation control element to the recognition region, a dynamic prompt element in association with the recognition region in the user interface, the dynamic prompt element indicating a touch duration of the sliding touch operation on the recognition region;

outputting for display, while at least the portion of the operation control element is in the recognition region, a fill animation in the dynamic prompt element, a filling degree of the fill animation being positively correlated with the touch duration of the sliding touch operation on the recognition region;

determining whether the touch duration reaches a threshold;

controlling, by processing circuitry when the touch duration reaches the threshold, the virtual object to automatically move in the virtual scene in a second movement state, a movement speed in the second movement state being faster than a movement speed in the first movement state; and cancelling display of the dynamic prompt element and display of the recognition region when the touch duration reaches the threshold.

2. The method according to claim 1, wherein a first graphical element indicating the first movement state is displayed at a first end of the dynamic prompt element, and a second graphical element indicating the second movement state is displayed at a second end of the dynamic prompt element.

3. The method according to claim 1, further comprising:

outputting for display a first state control element and a second state control element, wherein the first state control element is configured to switch a movement state of the virtual object, and the second state control element is configured to control the virtual object to stop moving automatically.

4. The method according to claim 3, further comprising:

controlling, based on a trigger operation on the first state control element, the virtual object to switch from the second movement state to the first movement state; and controlling, based on a trigger operation on the second state control element, the virtual object to stop moving automatically and to hold a virtual prop.

5. The method according to claim 3, further comprising:

canceling, based on a trigger operation on the first state control element or the second state control element, the display of the first state control element and the display of the second state control element.

6. The method according to claim 1, wherein the controlling the virtual object to automatically move in the virtual scene in the first movement state includes controlling, based on the sliding touch operation being performed from the position of the operation control element to the recognition region and the virtual object holding a virtual prop, the virtual object to automatically move in the virtual scene in the first movement state; and the method includes controlling, based on the sliding touch operation being performed from the position of the operation control element to the recognition region and the virtual object not holding the virtual prop, the virtual object to automatically move in the virtual scene in the second movement state.

7. The method according to claim 1, wherein the virtual object in the first movement state holds a virtual prop and automatically moves in the virtual scene; and the virtual object in the second movement state automatically moves in the virtual scene without holding the virtual prop.

8. The method according to claim 1, further comprising:

determining a movement speed of the virtual object as a first movement speed based on the touch duration being greater than or equal to 0 and less than the threshold; and determining the movement speed of the virtual object as a second movement speed based on the touch duration being greater than or equal to the threshold, wherein the second movement speed is a sum of a product of the touch duration and a specified ratio and the first movement speed.

9. The method according to claim 1, further comprising:

when the virtual object is in the first movement state, controlling, based on a tap operation on a specified region, the virtual object to automatically move in the virtual scene in the second movement state.

10. The method according to claim 9, wherein the controlling, based on the tap operation on the specified region, the virtual object comprises:

determining a movement speed corresponding to the second movement state according to attribute information of the tap operation; and controlling the virtual object to automatically move in the virtual scene at the movement speed corresponding to the second movement state.

11. A processing apparatus, comprising:

processing circuitry configured to:

output for display, in a user interface of a game application, an operation control element that is configured to control movement of a virtual object in a virtual scene;

output for display, based on a sliding touch operation being performed in the user interface from a position of the operation control element, a recognition region associated with the operation control element in the user interface;

determine that at least a portion of the operation control element is in the recognition region;

control, in response to determining that at least the portion of the operation control element is in the recognition region, the virtual object to automatically move in the virtual scene in a first movement state;

output for display, in response to the sliding touch operation being performed from the position of the operation control element to the recognition region, a dynamic prompt element in association with the recognition region in the user interface, the dynamic prompt element indicating a touch duration of the sliding touch operation on the recognition region;

output for display, while at least the portion of the operation control element is in the recognition region, a fill animation in the dynamic prompt element, a filling degree of the fill animation being positively correlated with the touch duration of the sliding touch operation on the recognition region;

determine whether the touch duration reaches a threshold;

control, when the touch duration reaches the threshold, the virtual object to automatically move in the virtual scene in a second movement state, a movement speed in the second movement state being faster than a movement speed in the first movement state; and cancel, when the touch duration reaches the threshold, display of the dynamic prompt element and display of the recognition region.

12. The processing apparatus according to claim 11, wherein a first graphical element indicating the first movement state is displayed at a first end of the dynamic prompt element, and a second graphical element indicating the second movement state is displayed at a second end of the dynamic prompt element.

13. The processing apparatus according to claim 11, wherein the processing circuitry is configured to output for display a first state control element and a second state control element;

the first state control element is configured to switch a movement state of the virtual object; and the second state control element is configured to control the virtual object to stop moving automatically.

14. The processing apparatus according to claim 13, wherein the processing circuitry is configured to:

control, based on a trigger operation on the first state control element, the virtual object to switch from the second movement state to the first movement state; and control, based on a trigger operation on the second state control element, the virtual object to stop moving automatically and to hold a virtual prop.

15. The processing apparatus according to claim 13, wherein the processing circuitry is configured to:

cancel, based on a trigger operation on the first state control element or the second state control element, the display of the first state control element and the display of the second state control element.

16. A non-transitory computer-readable storage medium, storing instructions which when executed by processor cause the processor to perform:

outputting for display, in a user interface of a game application, an operation control element that is configured to control movement of a virtual object in a virtual scene;

outputting for display, based on a sliding touch operation being performed in the user interface from a position of the operation control element, a recognition region associated with the operation control element in the user interface;

determining that at least a portion of the operation control element is in the recognition region;

controlling, in response to determining that at least the portion of the operation control element is in the recognition region, the virtual object to automatically move in the virtual scene in a first movement state;

outputting for display, in response to the sliding touch operation being performed from the position of the operation control element to the recognition region, a dynamic prompt element in association with the recognition region in the user interface, the dynamic prompt element indicating a touch duration of the sliding touch operation on the recognition region;

outputting for display, while at least the portion of the operation control element is in the recognition region, a fill animation in the dynamic prompt element, a filling degree of the fill animation being positively correlated with the touch duration of the sliding touch operation on the recognition region;

determining whether the touch duration reaches a threshold;

controlling, when the touch duration reaches the threshold, the virtual object to automatically move in the virtual scene in a second movement state, a movement speed in the second movement state being faster than a movement speed in the first movement state; and cancelling, when the touch duration reaches the threshold, display of the dynamic prompt element and display of the recognition region.

* * * * *